United States Patent
Osial et al.

[15] 3,668,548
[45] June 6, 1972

[54] SYSTEM FOR PROVIDING CONTINUOUSLY VARIABLE PUMP PULSES

[72] Inventors: Thaddeus A. Osial, Penn Hills; Richard J. Ravas, Monroeville, both of Pa.

[73] Assignee: Westinghouse Electric Corporation, Pittsburgh, Pa.

[22] Filed: June 26, 1968

[21] Appl. No.: 740,220

[52] U.S. Cl. ............................................................331/94.5
[51] Int. Cl. .............................................................H01s 3/09
[58] Field of Search ..............................................331/94.5; 315/240–243

[56] References Cited

UNITED STATES PATENTS

| | | |
|---|---|---|
| 3,387,177 | 6/1968 | Israel et al. .............................315/242 |
| 3,430,159 | 2/1969 | Roeber ...................................331/94.5 |

OTHER PUBLICATIONS

Melamed et al., Laser Action in Uranyl-Sensitized Nd-Doped Glass. Appl. Phys. Letters, Vol. 6, No. 3 (Feb. 1, 1965) pp. 43–45.

Giuliano et al., Investigation of Spectral Bleaching in Passive Q–Switch Dyes. Appl. Phys. Letters, Vol. 9, No. 5 (Sept. 1, 1966) pp. 196– 198.

*Primary Examiner*—William L. Sikes
*Attorney*—F. H. Henson and E. P. Klipfel

[57] ABSTRACT

Described is an electric flash producing system wherein the period of the flash can be continuously and accurately varied. These flashes are used, for example, as a pumping light source for laser crystals. Also described is a system for producing single giant spikes or a controlled number of giant spikes by the use of laser rods formed from uranyl-sensitized neodymium glass.

4 Claims, 3 Drawing Figures

INVENTORS
Thaddeus A. Osial &
Richard J. Ravas.
BY Ernest P. Klipfel
ATTORNEY 3,668,548

SYSTEM FOR PROVIDING CONTINUOUSLY VARIABLE PUMP PULSES

BACKGROUND OF THE INVENTION

As is known, the usual solid-state laser comprises a rod formed from a host material having integral or external surfaces formed into mirrors whose reflecting planes are generally perpendicular to the long axis of the rod. The host material is doped with a paramagnetic ion; and the rod is excited by an intense flash of light produced by a pump light. Such lasers are commonly referred to as pulsed, optically pumped solid-state lasers; and the output of the laser is a beam of coherent light.

Applications of pulsed, optically pumped solid-state lasers frequently require accurate control of the total laser pulse duration and the ability to conveniently vary the pulse duration over wide limits. Since the laser output envelope follows very closely the pumping light, the laser pulse duration can be controlled by controlling the duration of current flow through the arc discharge lamp or pump lamp which provides the pump light.

Laser pump pulses which are rectangular in shape and whose time duration can be made long are usually obtained by using a pulse forming network to supply current pulses to the arc discharge lamp. The pulse forming network, consisting of a combination of inductors and capacitors, is connected to the arc discharge lamp. This pulse forming network is charged to a predetermined voltage which is below the self-firing voltage of the lamp. However, when a trigger pulse is applied to the lamp, the gas within the lamp ionizes and permits the pulse forming network to discharge through the lamp. The duration of the current pulse is determined by the inductance and capacitance of the pulse forming network; and in prior art systems the duration of the output pulses could be varied only in discrete steps by using an appropriate number of sections, each section including an inductor and a capacitor. For a sufficient number of sections, the pulse became approximately rectangular with an exponential trailing edge; however, the pulse forming network, in and of itself, did not provide a means for conveniently and easily varying the duration of the output pulses and, hence, the duration of the pumping light as well as the duration of the output pulse from the laser.

SUMMARY OF THE INVENTION

As an overall object, the present invention seeks to provide a system for producing laser pump pulses whose duration can be continuously and accurately varied.

Another object of the invention is to provide a system for producing laser pump pulses of approximately rectangular shape with sharp cut-off trailing edges.

Still another object of the invention is to provide a system for producing single giant spikes or a controlled number of giant spikes when operated in conjunction with uranyl-sensitized neodymium glass.

In accordance with the invention, a pulse forming network is provided having an arc discharge lamp and a controlled rectifier connected in parallel across its output. The controlled rectifier preferably is a silicon controlled rectifier; however, it may also take the form of an ignitron or other device which will continue to conduct after it is once fired, until its anode voltage falls below a point at which current through the device will be supported. When a trigger pulse is applied to the discharge lamp to cause it to fire, this same pulse is also applied to a time delay network, the output of which is used to fire the controlled rectifier. In this manner, the trigger pulse will fire the discharge lamp, and after a predetermined time interval determined by the delay network, the controlled rectifier will fire to short out the discharge lamp. In this way, the duration of the pumping light pulse is controlled. The circuit additionally includes diodes which prevent reflected voltage pulses generated by the pulse forming network from reigniting the discharge lamp.

Further, in accordance with the invention, a pulse forming network and controlled rectifier arrangement are used to control the number of giant output spikes produced by a uranyl-sensitized neodymium doped glass laser. In this latter case, the spikes produced by the laser are directed onto a photocell which, in turn, produces voltage pulses which are fed to a counter. After a predetermined number of pulses are counted by the counter, it acts to fire the controlled rectifier associated with the pulse forming network, thereby terminating the pumping light pulse as well as the output spikes from the laser.

DESCRIPTION OF THE DRAWINGS

The above and other objects and features of the invention will become apparent from the following detailed description taken in connection with the accompanying drawings which form a part of this specification, and in which.

DESCRIPTION OF THE PREFERRED EMBODIMENTS

Figure 1:
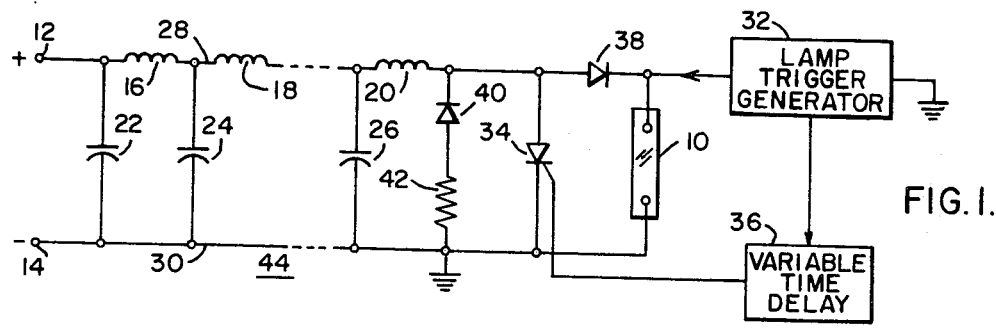
FIG. 1 is a schematic circuit diagram of a pulse forming network for a discharge lamp incorporating a controlled rectifier and diodes in accordance with the present invention.

With reference now to the drawings, and particularly to FIG. 1, an electronic flash producing system is shown including an arc discharge lamp 10 having its opposite terminals connected through a pulse forming network 44 to terminals 12 and 14 adapted for connection to a source of direct current potential. The pulse forming network in the particular embodiment shown herein includes three or more inductors 16, 18 and 20 in a network arrangement with capacitors 22, 24 and 26, in which the capacitors are connected across supply lines 28 and 30 leading from terminals 12 and 14 to the main electrodes of the discharge lamp 10.

The pulse forming network is essentially an energy storage device. When a trigger pulse is applied to one electrode of the lamp 10 from lamp trigger generator 32, the gas within the lamp ionizes; the lamp breaks down; and the energy stored in the pulse forming network is discharged through the lamp in the form of a current pulse. Assuming that the pulse forming network alone is used to supply pulses to the discharge device 10, the duration of the current pulse is determined by the inductance and capacitance of the pulse forming network and is given approximately by the expression:

$$T = 2n \sqrt{LC} \qquad (1)$$

where $T$ is the pulse duration, $L$ and $C$ are the inductance and capacitance of each section, and $n$ is the number of sections. Each section comprises an inductor and its associated capacitor such as, for example, inductor 16 and capacitor 22. To obtain maximum power transfer to the discharge lamp 10 and to eliminate reflections, the characteristic impedance, $Z_o$, of the pulse forming network is made equal to the nominal resistance of the discharge lamp. That is:

$$Z_o = \sqrt{L/C} \qquad (2)$$

Such a system provides pulses whose duration can be varied only in discrete steps by using an appropriate number of sections (i.e., appropriate choice of $n$ in the foregoing equation 1). For a sufficient number of sections, the pulse becomes approximately rectangular with an exponential trailing edge as illustrated, for example, in FIG. 2.

In accordance with the present invention a system is devised which provides a continuously variable duration, approximately rectangular pulse with a sharply cut-off trailing edge. The system includes a controlled rectifier, preferably a silicon controlled rectifier 34, connected across supply lines 28 and 30 in parallel with the discharge lamp 10. The output of the lamp trigger generator, comprising the trigger pulse applied to the discharge device 10, is also applied to a variable time delay circuit 36. The output of the circuit is, in turn, applied to the gate electrode of the silicon controlled rectifier 34. Hence, whenever the lamp 10 is triggered, the silicon controlled rectifier 34 will be triggered shortly thereafter, the time delay being determined by circuit 36. The circuit additionally includes a diode 38 in the supply line 28 between device 10 and rectifier 34, and a diode 40 and resistor 42 in shunt with the silicon controlled rectifier 34.

Figure 2:
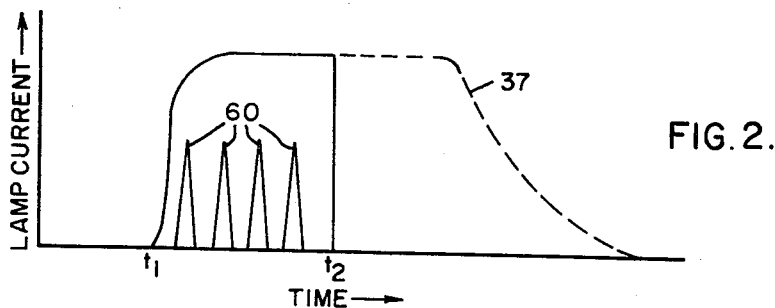
FIG. 2 is a graph illustrating the operation of the circuit of FIG. 1.

The operation of the circuit of FIG. 1 is perhaps best shown in FIG. 2 wherein lamp current is plotted against time. The leading edge of the pulse occurs at time $t_1$. Assuming that the silicon controlled rectifier 34 does not fire, the trailing edge of the pulse, shown by the broken line 37, is essentially exponential. Let us assume that at time $t_1$ a trigger pulse is applied to the arc discharge lamp 10, causing the lamp to ionize and the pulse forming network to begin discharging through the lamp. The trigger pulse is also applied to the variable time delay network 36 which delays the pulse by some predetermined time. At time $t_2$, a trigger pulse is applied to the gate electrode of silicon controlled rectifier 34 by network 36, causing the rectifier to conduct and effectively placing a short circuit across the lamp 10. The current is then diverted from the lamp 10 through rectifier 34, causing the lamp to extinguish. As will be appreciated, the trailing edge of the pulse at time $t_2$ can be varied by varying the time delay of circuit 36.

When the rectifier 34 short circuits the pulse forming network, a voltage pulse is reflected from the short circuit and travels toward the input end of the pulse forming network (i.e., toward terminals 12 and 14). If the input end of the pulse forming network is open circuited or fed from a high impedance generator as is the usual case, the pulse will again be reflected as a negative voltage pulse and travel back to the lamp. Since the rectifier 34 is a unidirectional device, it will not provide a short circuit for the negative polarity pulse. However, if the pulse is of sufficient amplitude, the lamp 10 may reignite resulting in a double light flash. In order to prevent this possibility, diode 38 serves to block the reflected pulse from appearing across the lamp and prevents the lamp from reigniting. As a consequence, the pulse forming network will charge to the opposite polarity. In order to remove the voltage reversal from the pulse forming network and to prepare the pulse forming network for recharging, the diode 40 in series with resistor 42 is shunted across the pulse forming network. Diode 40 is connected such that it is in the conducting state when the line reverses. The resistor 42 is made equal to the impedance of the discharge lamp 10 and, therefore, dissipates any remaining energy from the pulse forming network without introducing any additional reflections.

It will, of course, be appreciated that in systems which require wide variations in pulse duration, a more efficient system can be utilized by incorporating switches in the pulse forming network to alter the number of sections in the pulse forming network and effect a "rough" control of the pulse duration. The system described herein can then be used to provide a "fine" control of the pulse duration.

Figure 3:
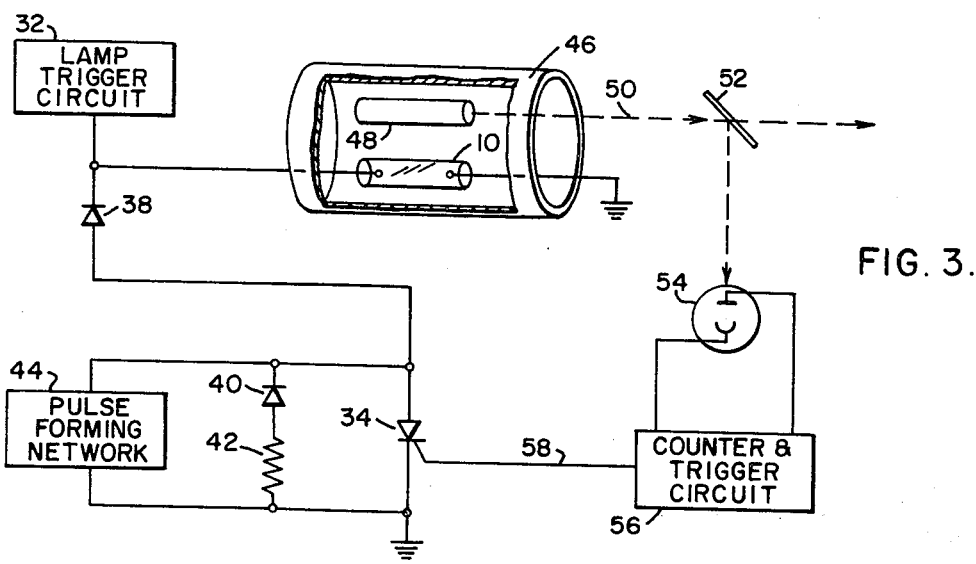
FIG. 3 is a schematic illustration of the use of the circuit of FIG. 1 for controlling the number of giant output spikes produced by a uranyl-sensitized neodymium doped glass laser.

With reference now to FIG. 3, an adaptation of the circuit of FIG. 1 is shown wherein the pulse forming network is identified by the reference numeral 44 and those elements which correspond to elements shown in FIG. 1 are identified by like reference numerals. In this case, the discharge lamp 10 is disposed within a cylinder 46 having internally reflecting surfaces. Also disposed within the cylinder 46 is a laser rod 48 which comprises uranyl-sensitized glass doped with neodymium. Such laser rods are described in detail in an article entitled "Laser Action in Uranyl-sensitized Nd-doped Glass" by P.W. French, N. T. Melamed and C. Hirayama, appearing at pages 43–45 of the Feb. 1, 1965 issue of Applied Physics Letters. The opposite ends of the rod 48 are reflecting, the left end of the rod preferably having a reflectivity of about 99 percent and the right end having a reflectivity of about 65 percent to 90 percent, such that the coherent light generated within the rod 48 may pass out through the partially reflecting end along the path 50.

It is a characteristic of uranyl-sensitized neodymium doped glass lasers that when they are subjected to a flash of light such as that produced by the discharge device 10, the output from the rod will be a series of giant spikes, the spacing between these spikes being between about 5 and 40 microseconds. This spacing, in turn, is dependent upon the reflectivity of the light-transmitting end of the laser rod the higher the reflectivity the greater the spacing. These spikes, in turn, are reflected from a partially reflecting mirror 52 and onto a photocell 54 which will produce a corresponding current pulse for each spike. These pulses, in turn, are fed to a counter and trigger circuit 56. When the number of spikes at the output of the laser rod 48 reaches the predetermined count of the counter 56, a pulse is produced on lead 58 to trigger the silicon controlled rectifier 34, thereby terminating the light pulse as well as the giant spikes from the laser rod 48.

This can be shown, for example, with reference to FIG. 2 wherein the giant spikes are represented by the reference numeral 60. Assuming that the discharge lamp 10 is again triggered at time $t_1$, the resulting flash of light will cause the giant spikes 60 to be produced. It will be assumed further, that the counter is set to count four spikes. After the four spikes are counted, the silicon controlled rectifier 34 is fired, whereupon the lamp 10 extinguishes at time $t_2$ and no further giant spikes are produced.

Furthermore, by varying the count of the counter 56, the number of giant spikes produced at the output can be varied or, for that matter, the output can be limited to a single spike. In this latter case, the counter circuit may be eliminated and the pulse for photocell 54 fed directly to the rectifier 34. The sharp cut off of the trailing edge of the lamp pulse as shown in FIG. 2 will permit shutting off the lamp before another spike can be generated.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a system for producing a discrete number of output pulses of coherent light, the combination of a laser rod capable of producing spaced output light spikes when optically pumped, electrical energy storage means, lamp means for producing pulses of optical energy for optically pumping said laser rod, circuit means connecting said energy storage means to said lamp means for energizing the latter, controlled rectifier means connected in shunt with said lamp means for short-circuiting said energy storage means to thereby extinguish the optical energy from said lamp means when conduction is initiated in said controlled rectifier means, and means responsive to said coherent light output for firing said controlled rectifier means to thereby extinguish the optical energy from said lamp means.

2. The system of claim 1 wherein said lamp means is of the arc discharge type and further means are provided responsive to said output pulses of coherent light for counting said pulses and generating a control signal for selectively firing said controlled rectifier.

3. The system of claim 2 wherein said coherent light-responsive means is responsive to at least one of said coherent light pulses and comprises a counter, the output of the counter being connected to the gate electrode of said controlled rectifier means to fire the same after a predetermined number of coherent light pulses have been counted by the counter.

4. The system of claim 1 wherein said laser rod is of a solid-state material having a characteristic such that it generates a series of coherent output pulses when pumped optically.

* * * * *